March 6, 1934.  W. S. REA  1,949,761
PORTABLE GREASE GUN
Filed March 11, 1931
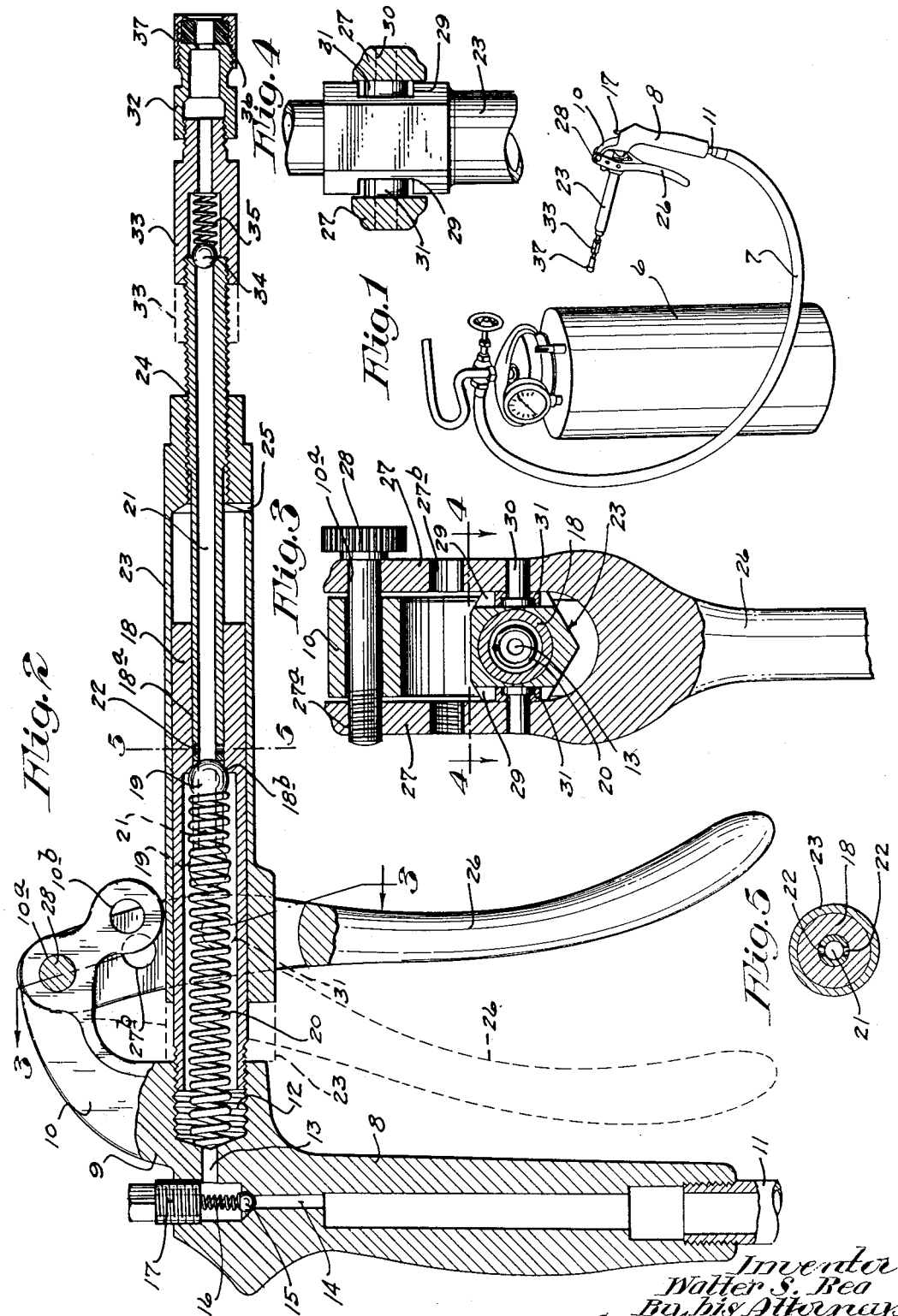

Patented Mar. 6, 1934

1,949,761

UNITED STATES PATENT OFFICE 1,949,761

PORTABLE GREASE GUN

Walter S. Rea, Minneapolis, Minn., assignor, by mesne assignments, to M. Dysthe

Application March 11, 1931, Serial No. 521,778

6 Claims. (Cl. 221—47.4)

My invention provides an extremely simple and highly efficient portable grease gun adapted for the delivery of very heavy as well as lighter greases under very high pressure, when such high pressure is required to effect the proper discharge of the grease from the gun and delivery thereof to the bearing or part to be lubricated.

Generally stated, the invention consists of the novel devices, combinations of devices, and arrangement of parts hereinafter described and defined in the claims.

This improved grease gun operates on what is believed to be a broadly new principle and is capable of various modifications. It combines a novel arrangement of release valve control and discharge by grease displacement, which latter operates with such high power that, under hand control, the discharge of grease can be readily produced at pressures as above ten thousand pounds per square inch.

A commercial embodiment of the improved grease gun is illustrated in the accompanying drawing, wherein like characters indicate like parts throughout the several views.

Referring to the drawing:

Fig. 1 is a perspective showing the grease gun connected to a grease supply tank;

Fig. 2 shows the grease gun chiefly in vertical axial section, but with some parts in full;

Fig. 3 is a transverse section taken on the line 3—3 of Fig. 2;

Fig. 4 is a fragmentary horizontal section taken on the line 4—4 of Fig. 3; and

Fig. 5 is a transverse section taken on the line 5—5 of Fig. 2.

The grease-containing tank 6 is of well known type from which the grease is adapted to be discharged through a hose or flexible pipe 7, under pressure from air contained in the tank. The grease gun is attached to the free end of the hose 7 and its relatively fixed member, as shown, is in the form of a tubular handle 8 that terminates in a head 9 having an upwardly and forwardly extended arm-like bracket 10. The lower end of the tubular handle 9 is directly connected to the free end of the hose 7 by a tubular coupling 11. The head 9 is formed with an internally threaded grease-receiving chamber 12 that is connected to the interior of the tubular handle 8 through ports 13 and 14. A small check valve 15, shown as in the form of a ball, is seated in the delivery end of port 14 and is lightly pressed by a small coiled spring 16 which, as shown, reacts against the plug 17 screwed into the top of the head 9.

The gun cylinder or barrel 18, at its rear end is tightly screwed into the grease chamber 12 of the head 9 and receives its grease directly therefrom. The bore in the outer end portion of the gun cylinder 18 is contracted at $18^a$ and at its inner portion affords a valve seat $18^b$ against which is normally seated a choke valve 19, shown as in the form of a ball. A quite heavy coiled spring 20, located in the enlarged bore of cylinder 8, reacts against the head 9 and normally presses the valve 19 against its seat $18^b$, thereby closing the bore $18^a$ of the cylinder and preventing discharge of grease from the gun.

Working slidably in close fit within the bore $18^a$ of cylinder 18 is a tubular piston stem 21, the inner end of which is engageable with valve 19 and acts thereon, as hereinafter described. At or close to its inner end, the valve stem 21 is provided with at least one and, as shown, with two radial or lateral ports 22 that are normally closed by the wall of the bore $18^a$.

Working slidably on the exterior of the cylinder 18 is a piston sleeve 23, the contracted end of which, beyond the outer end of cylinder 18, is rigidly secured to the piston stem 21 preferably by threaded engagement, as indicated at 24. Close to its contracted outer end portion, sleeve 23 is provided with an air port 25 that prevents the caging of air in the outer end of said sleeve when the latter and the piston stem are reciprocated axially.

For reciprocating the piston stem 21 and sleeve 23, against the tension of spring 20, there is provided a lever 26 which, in this hand-operated device, is so associated with the handle 8 that it may be engaged by the fingers of the hand holding said handle. This lever 26 here illustrated is bifurcated at its upper end and thereby formed with laterally spaced arms 27 that embrace the rear end of the piston sleeve 23 and the bracket 10. Bracket 10 is provided with pin seats $10^a$ and $10^b$ and the arms 27 are provided with pin seats $27^a$ and $27^b$. A pivot pin 28 is insertable through pin seats $10^a$ and $27^a$ or at will through pin seats $10^b$ and $27^b$. To afford a sliding pivotal connection between lever 26 and piston sleeve 23, the rear end of said sleeve is formed with vertical slots 29 and the arms 27 of lever 26 are provided with pivot pins 30 equipped with rollers 31 that work in said slots 29, as best shown in Figs. 3 and 4.

A suitable nozzle or discharge head is connected to the outer or delivery end of the tubular piston stem 21. As shown, this nozzle or discharge head 32 is directly connected to the outer end of stem 21 by a coupling tube 33 that contains an outwardly opening check valve 34 in the form of a ball that directly engages the outer end of stem 21 and is pressed by a coiled spring 35 seated in said coupling tube. Also, as shown, nozzle 32 is provided with a pliable gasket 36 held by a collar 37 and adapted to engage with a grease-receiving nipple. As far as this invention is concerned, the grease gun might be provided with any suitable form of discharge nozzle or head.

*Operation*

For the discharge of grease under ordinary conditions, the lever 26 will be pivotally connected to bracket 10 with pin 28 inserted in the seats 10ᵃ and 27ᵃ as shown in the drawing. Normally, spring 20 not only holds check valve 19 against its seat 19ᵇ, thereby preventing the discharge of grease from the gun cylinder or barrel into the tubular stem, but presses the tubular stem, sleeve 23 and lever 26 outward, as shown by full lines in Fig. 2. The air pressure contained in the grease tank or any other means employed for delivering the grease to the gun may, of course, vary and will depend somewhat on the viscosity of the grease being used, it being, of course, understood that the harder the grease, the higher will be the pressure required for the delivery thereof to the gun. For the purposes of illustration, it will be assumed that the air pressure contained in the tank 6 is one hundred pounds more or less, and also let it be assumed that check valve 15 will open under a grease pressure of approximately ten pounds and that the check valve 34 will open under a pressure of approximately forty pounds.

When lever 26 is moved from its full line to or toward its dotted line position in Fig. 2, the first effect thereof will be to remove choke valve 19 from its seat 18ᵇ and the second effect thereof will be to move valve stem 21 so as to uncover and open its ports 22; and when this is done, the grease can flow from the cylinder 18 into the tubular stem 21 through ports 22. If, when the gun is applied to a grease-receiving nipple, for example, and the resistance to the delivery of the grease thereto does not exceed the pressure under which the grease is delivered to the cylinder 18 from the tank 6, the grease will flow to the said nipple or part being lubricated as long as the choke valve 19 remains in a port-opening position, and irrespective of force produced by the action of the lever 26 and irrespective of displacement produced by the inward movement of the stem 21. If, however, the resistance to the delivery of oil to the nipple or part being lubricated exceeds the pressure produced from the tank 6, which is a condition not only occasionally but usually encountered, then the force produced by the lever 16 and the displacement produced by the inward movement of the stem 21 become factors of the utmost importance. Suppose, for example, that a pressure of four or five thousand pounds is required to deliver the grease to a dried up or plugged nipple. In that event, even when choke valve 19 is initially unseated and ports 22 are opened, there would be no flow of grease into the stem 21 under pressure such as delivered from the tank 6 or any similar source. Until lever 26, by further movement, forces the stem 21 with valve 19 seated against the same, farther into cylinder 18, thereby producing under very high pressure, positive displacement of the grease from cylinder 18 through ports 22 into the tubular stem and to the nipple or part being lubricated.

In practice, with the grease gun illustrated in the drawing of this application, I have found that with the pin 28 applied as shown in said drawing and by hand power applied to the handle 8 and lever 26, grease can be discharged from the gun under a pressure as high as five thousand pounds per square inch. Of course, under these high resisting pressures, the grease will be discharged from the gun only intermittently or one discharge for each movement of the lever 26 from its full line to its dotted line position in Fig. 2. If, however, during one of the high pressure displacement producing discharges, the resistance of the receiving nipple should break down and be reduced to less than that of the pressure produced by the gun from the tank 6, then a continuous discharge would be established and would be continued until by release of lever 26, spring 20 again moves choke valve 19 back to its seated position.

In some rare instances, pressures as high as ten thousand pounds more or less will be found necessary to open up and effect an initial charge of grease to a grease-receiving nipple or bearing. When such conditions are encountered, the power of the lever 26 may be increased so as to accomplish discharge of grease under the pressure stated and up to as high as fourteen thousand pounds per square inch, by shifting the pin 28 into pin seats 10ᵇ and 27ᵇ.

The function of the check valve 15 is to prevent a backward flow of grease into the handle 28 when pressures are produced in the gun cylinder 18 above the pressure under which grease is delivered thereto from the tank 6. Check valve 34 prevents a back flow or suction of grease from the nozzle into the tubular stem and it also prevents a leakage or other discharge of grease from the gun until pressure on the grease has been established in excess of the pressure under which said valve is seated, to wit: the assumed forty pounds per square inch.

From what has been said, it is obvious that the grease gun described is capable of a wide range of modification all within the spirit of the invention herein disclosed and within the scope of the appended claims.

What I claim is:

1. A grease gun comprising a gun cylinder, a head applied to the receiving end of said cylinder and provided with means for the delivery of grease therethrough into said cylinder, a tubular piston stem working through the delivery end of said cylinder and provided at its outer end with a discharge nozzle, a check valve in said cylinder normally cutting off communication between said cylinder and the interior of said stem, but arranged to be unseated by inward movement of said stem to thereby permit the discharge of grease from said cylinder into said stem, a piston sleeve working on the exterior of said cylinder and at its outer end connected to said tubular piston stem, and a lever pivoted to said head and connected to said sleeve for moving said sleeve and causing said stem to move into said cylinder, said lever being variably connected to said head for varying its leverage action.

2. A grease gun comprising a gun cylinder, a head applied to the receiving end of said cylinder and provided with means for the delivery of grease therethrough into said cylinder, a tubular piston stem working through the delivery end of said cylinder and provided at its outer end with a discharge nozzle, a check valve in said cylinder normally cutting off communication between said cylinder and the interior of said stem, but arranged to be unseated by inward movement of said stem to thereby permit the discharge of grease from said cylinder into said stem, a piston sleeve working on the exterior of said cylinder and at its outer end connected to said tubular piston stem, and a lever pivoted to said head and connected to said sleeve for moving said sleeve and causing said stem to move into said cylinder, said head being formed with a handle located so nearly adjacent said lever that both may be engaged by the same hand of the operator.

3. A grease gun comprising a gun cylinder, a head applied to the receiving end of said cylinder and provided with means for the delivery of grease therethrough into said cylinder, a tubular piston stem working through the delivery end of said cylinder and provided at its outer end with a discharge nozzle, a check valve in said cylinder normally cutting off communication between said cylinder and the interior of said stem, but arranged to be unseated by inward movement of said stem to thereby permit the discharge of grease from said cylinder into said stem, a piston sleeve working on the exterior of said cylinder and at its outer end connected to said tubular piston stem, and a lever pivoted to said head and connected to said sleeve for moving said sleeve and causing said stem to move into said cylinder, said tubular stem having ports adjacent said check valve arranged to be opened when said check valve is unseated by inward movement of said piston stem.

4. A grease gun comprising a gun cylinder, a head applied to the receiving end of said cylinder and provided with means for the delivery of grease therethrough into said cylinder, a tubular piston stem working through the delivery end of said cylinder, and provided at its outer end with a discharge nozzle, a check valve in said cylinder normally cutting off communication between said cylinder and the interior of said stem, but arranged to be unseated by inward movement of said stem to thereby permit the discharge of grease from said cylinder into said stem, a piston sleeve working on the exterior of said cylinder and at its outer end connected to said tubular piston stem, a lever pivoted to said head and connected to said sleeve for moving said sleeve and causing said stem to move into said cylinder, and a spring in said cylinder operative on said check valve normally to hold the same in port-closing position and said piston stem axially projected, said piston stem having ports adjacent said check valve, arranged to be opened when said piston stem is moved axially inward to unseat said check valve.

5. A grease gun comprising a gun cylinder, a head applied to the receiving end of said cylinder and provided with means for delivery of grease therethrough into said cylinder, a tubular piston stem working through the delivery end of said cylinder and provided at its outer end with a discharge nozzle, a check valve in said cylinder normally cutting off communication between said cylinder and the interior of said stem, but arranged to be unseated by inward movement of said stem to thereby permit the discharge of grease from said cylinder into said stem, a piston sleeve working on the exterior of said cylinder and at its outer end connected to said tubular piston stem, a lever pivoted to said head and connected to said sleeve for moving said sleeve and causing said stem to move into said cylinder, and check valves, one in said grease delivery conduit of said head and the other in the discharge end portion of said piston stem, and which check valves are arranged to be opened by pressure of the grease in the direction of the discharge flow thereof.

6. A grease gun comprising a gun cylinder, a head applied to the receiving end of said cylinder and provided with means for the delivery of grease therethrough into said cylinder, a tubular piston stem working through the delivery end of said cylinder and provided at its outer end with a discharge nozzle, a check valve in said cylinder normally cutting off communication between said cylinder and the interior of said stem, but arranged to be unseated by inward movement of said stem to thereby permit the discharge of grease from said cylinder into said stem, a piston sleeve working on the exterior of said cylinder and at its outer end connected to said tubular piston stem, and a lever pivoted to said head and connected to said sleeve for moving said sleeve and causing said stem to move into said cylinder.

WALTER S. REA.